(12) United States Patent
Belda Pla et al.

(10) Patent No.: US 7,366,327 B2
(45) Date of Patent: Apr. 29, 2008

(54) SYSTEM FOR RECOGNIZING WHEELS BY ARTIFICIAL VISION

(75) Inventors: Jesús Belda Pla, Carcaixent (ES); Jorge Broto Ruiz, Valencia (ES)

(73) Assignee: Eines Informatica, S.C.V., Valencia (ES)

( * ) Notice: Subject to any disclaimer, the term of this patent is extended or adjusted under 35 U.S.C. 154(b) by 595 days.

(21) Appl. No.: 10/783,860

(22) Filed: Feb. 20, 2004

(65) Prior Publication Data
US 2005/0185833 A1 Aug. 25, 2005

(51) Int. Cl.
*G06K 9/00* (2006.01)
(52) U.S. Cl. .................. 382/109; 382/152; 701/69
(58) Field of Classification Search ................ 382/100, 382/103, 104, 106, 107, 143–145, 180, 181, 382/203, 219, 254, 274, 276, 318, 109, 151, 382/168, 152, 193, 199, 214, 282, 305; 702/95, 702/151; 701/32, 41, 69; 180/252
See application file for complete search history.

(56) References Cited

U.S. PATENT DOCUMENTS

| | | | |
|---|---|---|---|
| 5,808,906 A * | 9/1998 | Sanchez-Revuelta et al. | 702/151 |
| 6,474,434 B1 * | 11/2002 | Bech | 180/252 |
| 6,704,434 B1 * | 3/2004 | Sakoh et al. | 382/104 |
| 7,058,494 B2 * | 6/2006 | Matsumoto et al. | 701/41 |
| 7,065,462 B2 * | 6/2006 | Merrill et al. | 702/95 |
| 7,089,099 B2 * | 8/2006 | Shostak et al. | 701/32 |

* cited by examiner

*Primary Examiner*—Seyed Azarian
(74) *Attorney, Agent, or Firm*—Klauber & Jackson L.L.C.

(57) ABSTRACT

The system includes wheel locating equipment, image capturing equipment, lighting equipment, a first control device, first communicating installations for communications between the first control device and the image capturing equipment, and second communicating installations for communications between the first control device and the lighting equipment. The image capturing equipment and the lighting equipment are arranged above the wheel locating equipment so as to enable the image capturing equipment to capture an image of a wheel. The first communicating installations sends the image to the first control device and the first control device processes the image to obtain data for identifying a wheel model. The invention also includes the process using the described system. The main step of the process is converting a circular portion of an image into a rectangular image by a polar transformation.

44 Claims, 6 Drawing Sheets

SYSTEM FOR RECOGNIZING WHEELS BY ARTIFICIAL VISION

OBJECT OF THE INVENTION

The system automatically recognizes any wheel model in a production or assembly line within minimum lapses.

BACKGROUND OF THE INVENTION

There are systems known in the art for recognizing wheels, but said systems have the following drawbacks:

The systems not using artificial vision are based on calculating diameter and width of the wheel and guessing which material (aluminum or steel) the wheel is made of. However, these data are not enough to exactly determine the wheel model, given that same material and dimensions may lead to different models.

Determining the precise wheel model is crucial, since same dimensions and composition models may have different features, like using or not using fixed balancing leads to balance the wheel, and in case the balancing leads are used they may be placed on the inside or outside.

The systems not using artificial vision make use of palpators and sensors which need to approach and touch the wheel to determine dimensions and material. This procedure may result in undesired bumps and scratches.

Some of the systems not using artificial vision require ultrasonic or lighting (laser) devices to determine wheel dimensions.

Other systems using artificial vision use detection methods with a process time longer than that required in the present invention. The methods used in the known systems are affected amongst other factors by the position of the wheel when the detection is being carried out.

Other systems using artificial vision do not have a reliability index close to 100%.

DESCRIPTION OF THE INVENTION

The present invention discloses a system for recognizing wheels by artificial vision comprising wheel locating means, first image capturing means, first lighting means and first control means comprising. The first control means in turn comprises:

first communicating means for communications between the first control means and the first image capturing means;

second communicating means for communications between the first control means and the first lighting means.

The function and arrangement of the components in the present invention are as follows:

the first image capturing means and the first lighting means are arranged above the wheel locating means so as to enable the first image capturing means to capture an image of a wheel to obtain a captured image;

the first communicating means sends said image to the first control means;

the first control means processes said image to obtain data for identifying a wheel model.

The present invention also includes a process for recognizing wheels by artificial vision using the described system.

The main step of the process is converting a circular portion of an image into a rectangular image by a polar transformation.

The sequential process comprises the following steps:

capturing an image of a wheel situated on the locating means by the first image capturing means to obtain a captured image;

applying a first filtering stage on the captured image by the first filtering means to obtain a first filtered image;

measuring the wheel and determining material to obtain wheel dimensions and wheel material;

converting a circular portion of the first filtered image into a rectangular image through a polar transformation by the first transforming means to obtain a transformed image;

applying a second filtering stage on the transformed image by the second filtering means to obtain a second filtered image;

analyzing the second filtered image by comparing with pre-set standard wheel models stored in the storing means for matching a wheel design to obtain a recognized wheel;

sending an identification of the recognized wheel to the recognizing means;

returning to initial stage for receiving a next wheel to be recognized.

Thus, the wheel recognition system according to the present invention has a series of advantages over the systems known in the art:

Detection is achieved just by using artificial vision.

Given that only artificial vision is used, wheel recognition is carried out from a distance, thereby avoiding bumps and scratches.

Process time is just 300 milliseconds, by all means shorter than time required by the known systems since the method used is quite simple and independent from the wheel position when the detection is being carried out. The present system recognizes unique distinguishing features of each wheel model.

The present system works independently whether or not there is a tyre mounted on the wheel.

The present system guarantees a reliability index close to 100%, since the method used is based on intrinsic features of the wheel to be recognized, processing all the factors to be taken into account, and because the present system uses a preprocess in which a polar transformation is applied to a captured image.

Another feature of the invention is the ease of use of the present system. The system is provided with methods for learning and calibrating new models. Thus, any operator without any skill in artificial vision is enabled to adjust the system and work with it.

The invention is provided with an easy and assisted way for calibrating the system in an easy and systematic way which allows non-skilled people to work with the system without any difficulty. Thanks to said calibration, standards and measures of the wheels which will be used afterwards for comparing with the captured images by the first image capturing means are obtained.

One of the novel techniques in the present invention is the possibility to distinguish areas of the wheel not showing the necessary conditions to achieve an efficient detection. In this way it is assured that the obtained standards are fully valid together with conditioning the search sectors in wheels of the same model.

On the other hand, the fact that the standards are unique for each wheel model assures that wheel detection is guaranteed.

DESCRIPTION OF AN EMBODIMENT OF THE INVENTION

Figure 1:
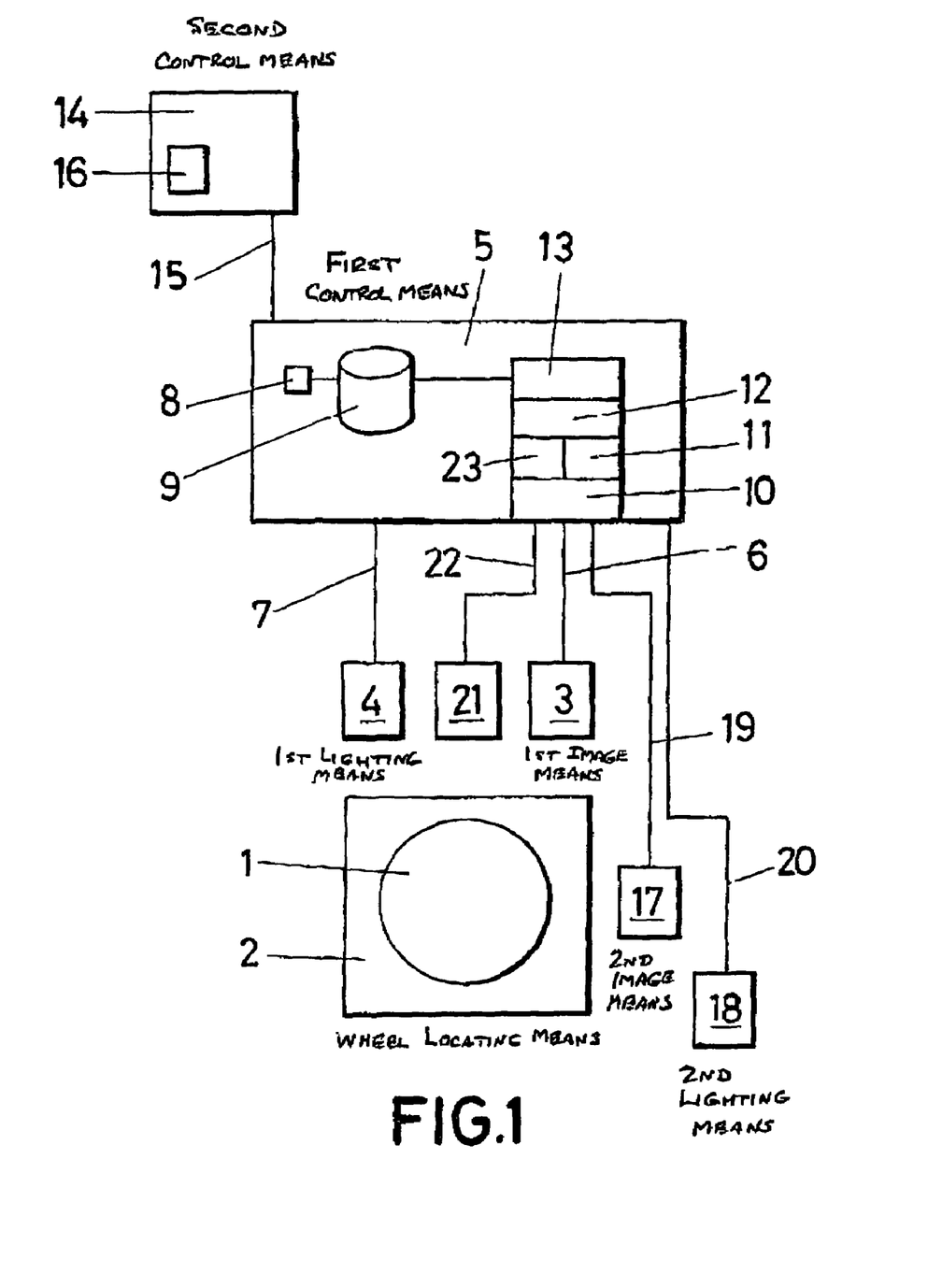
FIG. 1 shows a view of the system of the invention.

According to the numbering adopted in the drawings, the system for recognizing wheels 1 by artificial vision comprises:
wheel locating means 2;
first image capturing means 3;
first lighting means 4;
first control means 5 comprising:
  first communicating means 6 for communications between the first control means and the first image capturing means 3;
  second communicating means 7 for communications between the first control means 5 and the first lighting means 4;
wherein:
  the first image capturing means 3 and the first lighting means 4 are arranged above the wheel locating means 2 so as to enable the first image capturing means 3 to capture an image of a wheel to obtain a captured front image;
  the first communicating means 6 sends said front image to the first control means 5;
  the first control means 5 processes said front image to obtain data for identifying a wheel model.

According to a feature of the system, the first control means 5 further comprises calibrating means 8 to set standard wheel models which the wheel to be recognized are compared to.

According to another feature of the system, the first control means 5 further comprises storing means 9 for storing standard wheel models which the wheel to be recognized are compared to.

Additionally, the first control means 5 comprises:
first filtering means 10 for filtering a captured front image to obtain a first front filtered image;
first transforming means 11 for converting a circular portion of the first filtered front image into a rectangular portion to obtain a transformed front image;
second filtering means 12 for filtering a transformed front image to obtain a second filtered front image;
recognizing means 13 for receiving an identification of a recognized wheel.

Figure 5:
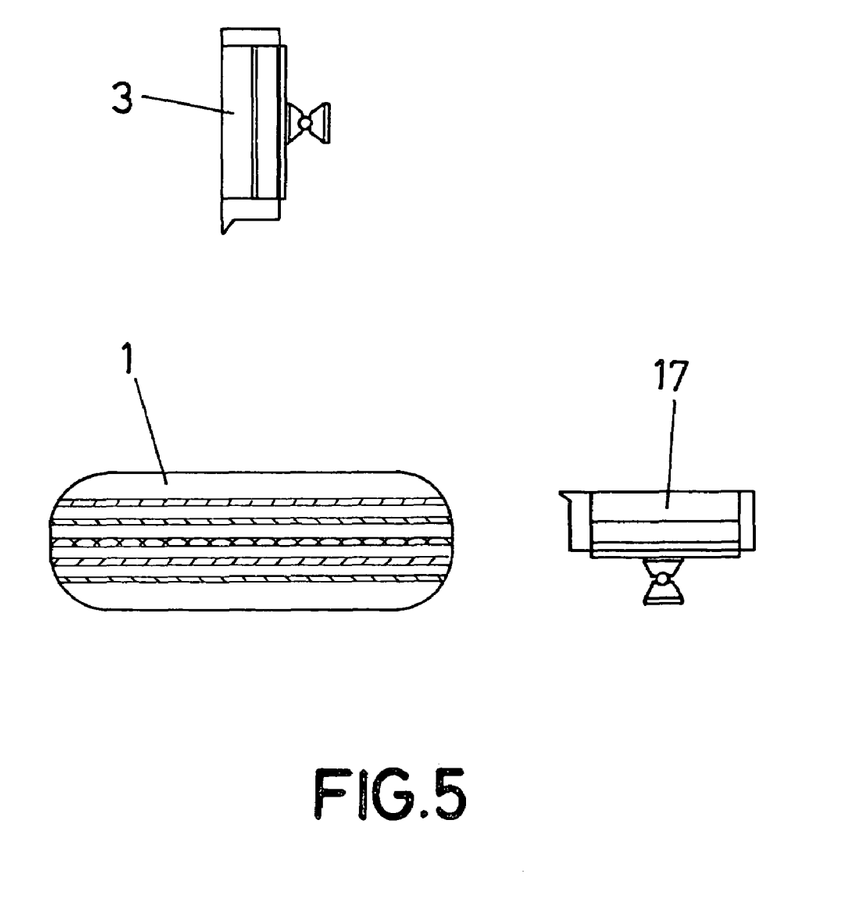
FIG. 5 shows a wheel, the first image capturing means and the second image capturing means.
Figure 6:
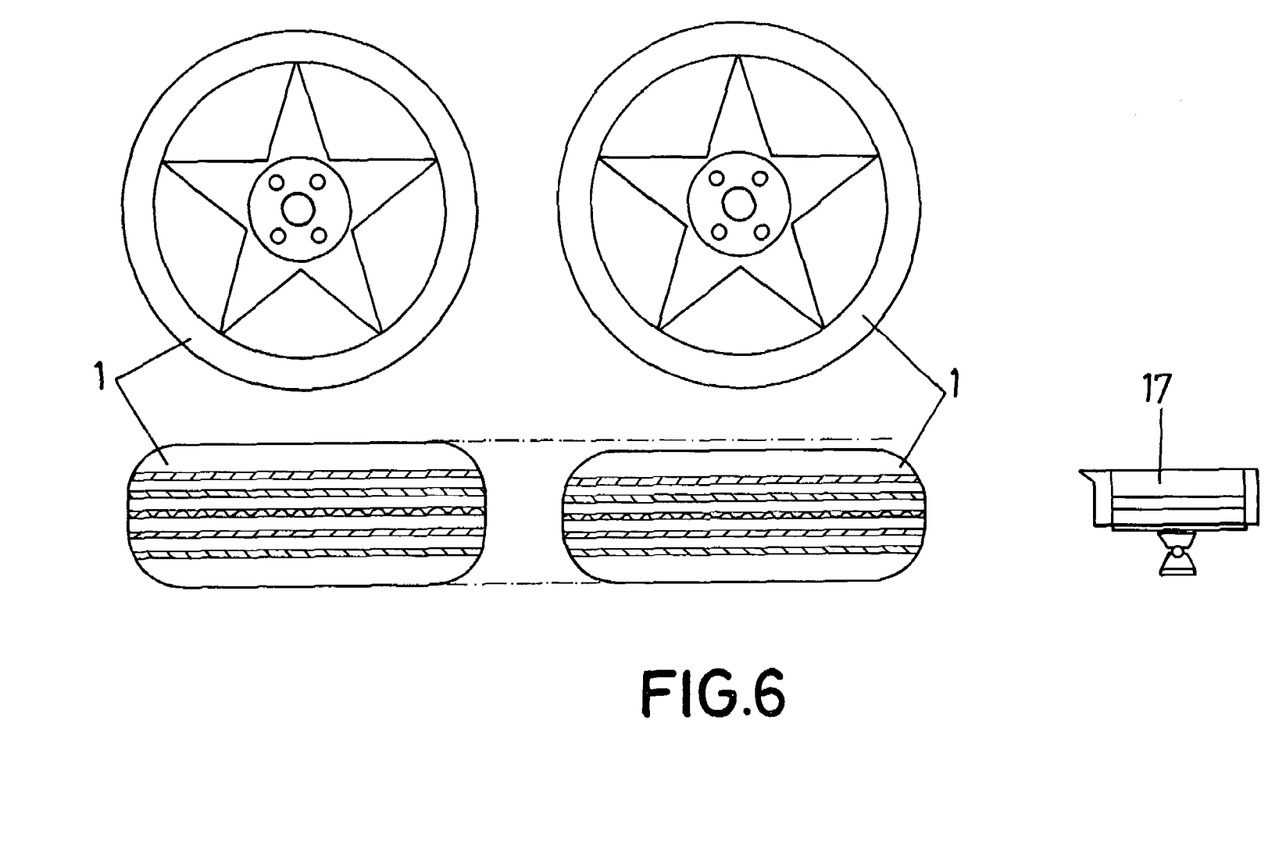
FIG. 6 shows two wheels identical except from the width and the second image capturing means detecting said difference.

The system may also include second image capturing means 17, second lighting means 18, third communicating means 19 for communications between the first control means 5 and the second image capturing means 17, and fourth communicating means 20 for communications between the first control means 5 and the second lighting means 18. In this embodiment:
  the second image capturing means 17 and the second lighting means 18 are arranged on a side of the wheel locating means 2 so as to enable the second image capturing means 17 to capture a side image of a wheel to obtain a side captured image;
  the third communicating means 19 sends said side image to the first control means 5;
  the first control means 5 processes said side image to obtain data for identifying a wheel model.

Figure 7:
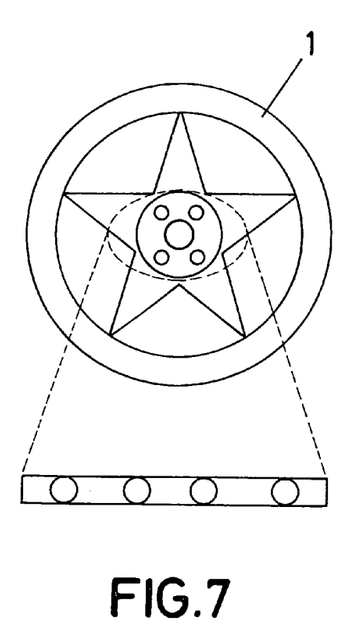
FIGS. 7 and 7A show two wheels identical except from the number of holes and an image after the polar transformation has been applied to the central image of the wheels.
Figure 7A:
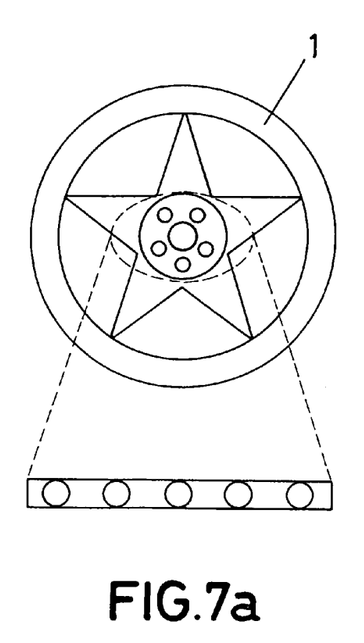

Additionally, the system may include third image capturing means 21, fifth communicating means 22 for communications between the first control means 5 and the third image capturing means 21, and second transforming means 23 for converting a circular portion of the central image into a rectangular portion to obtain a transformed central image. In this case:
  the third image capturing means 21 are arranged above the wheel locating means 2 so as to enable the third image capturing means 21 to capture a central image of a wheel 1 to obtain a central captured image;
  the fifth communicating means 22 sends said side image to the first control means 5;
  the first control means 5 processes said side image to obtain data for identifying a wheel model.

Optionally, the system may include second control means 14 external to the first control means 5, wherein the first control means 5 further comprises sixth communicating means 15 for communications between the first control means 5 and the second control means 14.

The second control means 14 are enabled to include at least one controller 16 selected from a production machine controller, an assembly machine controller, a production line controller, an assembly line controller and combinations thereof.

The process for recognizing wheels by artificial vision in a system as defined above comprises a step for converting a circular portion of an image into a rectangular image by a polar transformation.

Figure 4:
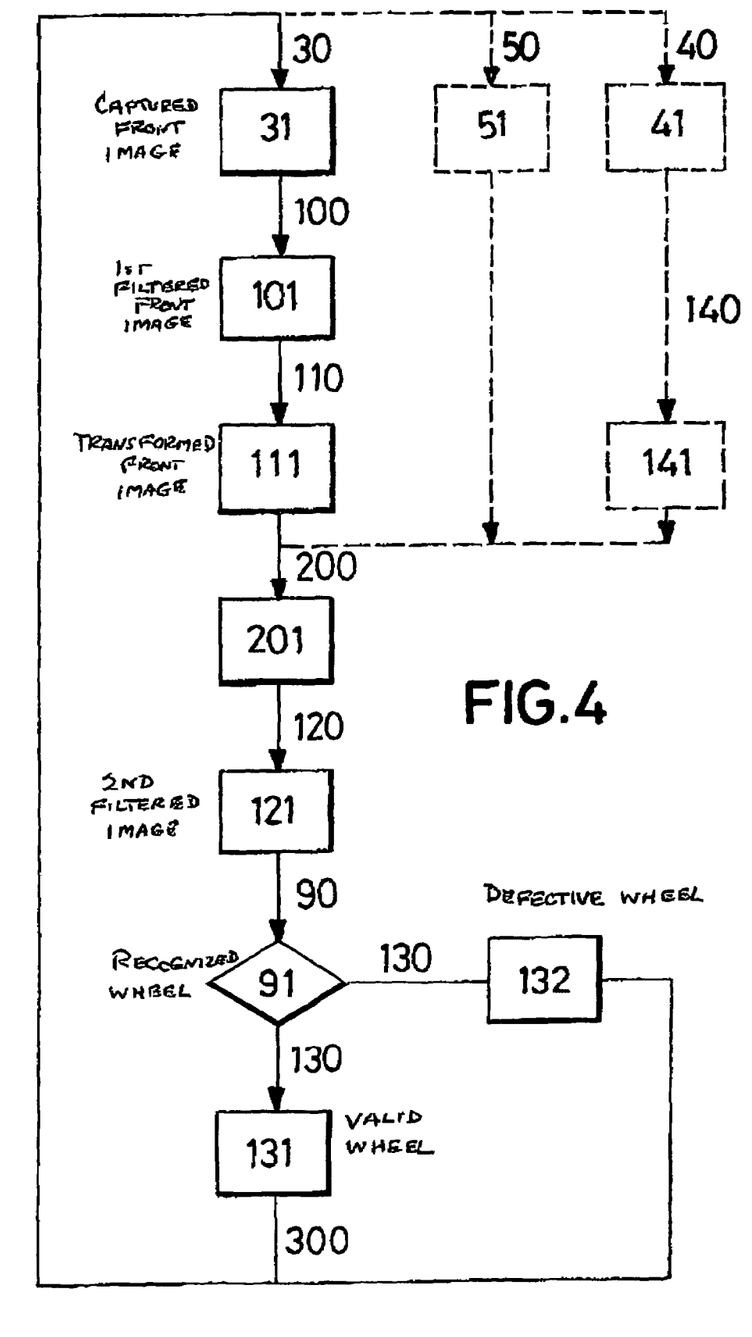
FIG. 4 shows a flow chart of the process of the invention.

The sequential process comprises the following steps:
capturing a front image 30 of a wheel 1 situated on the locating means 2 lit by first lighting means 4, by the first image capturing means 3 to obtain a captured front image 31;
applying a first filtering stage 100 on the captured front image 31 by the first filtering means 10 to obtain a first filtered front image 101;
converting a circular portion of the first filtered front image 101 into a rectangular front image through a polar transformation 110 by the first transforming means 11 to obtain a transformed front image 111;
measuring the wheel and determining material 200 to obtain wheel dimensions and wheel material 201;
applying a second filtering stage 120 on the transformed image 111 by the second filtering means 12 to obtain a second filtered image 121;
analyzing 90 the second filtered image 121 by comparing with pre-set standard wheel models stored in the storing means 9 for matching a wheel model to obtain a recognized wheel 91;

sending an identification 130 of the recognized wheel 91 to the recognizing means 13;

returning to initial stage 300 for receiving a next wheel 1 to be recognized.

Additional steps are allowed to be included in the process. Some of these steps are:

capturing a central image 40 of a wheel situated on locating means lit by first lighting means, by third image capturing means 21, to obtain a captured central image 41;

converting a circular portion of the central image 140 into a rectangular central image through a polar transformation by the second transforming means to obtain a transformed central image 141.

A further additional step comprises capturing a side image 50 of a wheel situated on the locating means 2 lit by second lighting means 18, by second image capturing means 17, to obtain a captured side image 51. The captured side image 51 enables to distinguish two wheels showing coincident transformed front image 111 and transformed central image 141.

It is also possible that the process comprise all the additional steps.

Independently of the steps included in the process, the recognized wheel takes a value selected between:

valid wheel 131 when the second filtered image and the pre-set standard wheel model are matched;

defective wheel 132 when the second filtered image and the pre-set standard wheel model are matched.

Figure 2:
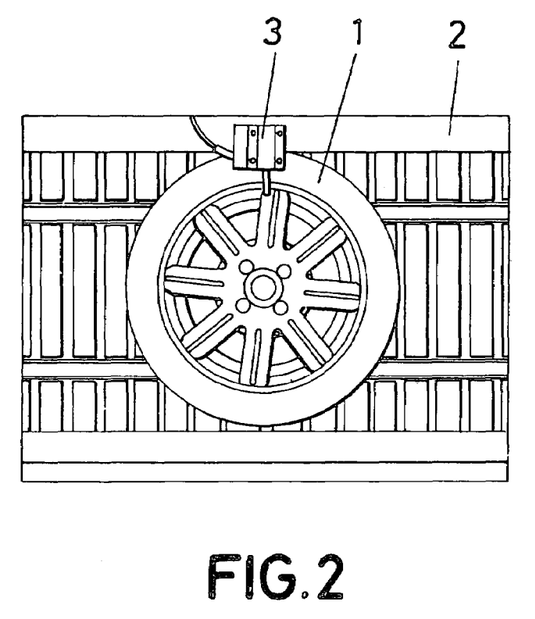
FIG. 2 shows an image of a wheel captured by the first image capturing means.

The process of the invention enables a user to set which portions of a captured image 31 are visible. Thus, the first filtering stage comprises:

dividing the captured image 31 into 360°/α sectors, α being the degrees per sector;

selecting the sectors showing a complete surface of the captured image 31 to obtain a plurality of selected sectors;

preparing the selected sectors to adequate black and white/color tone levels.

Particularly in a preferred process of the invention α is 45°. Next, diameter of the wheel is determined disregarding non-selected sectors.

Figure 3:
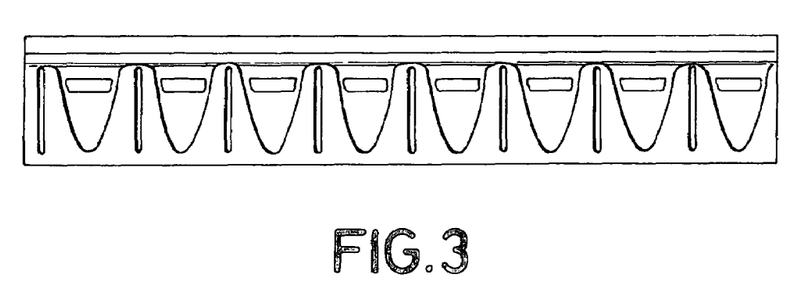
FIG. 3 shows an image after the polar transformation has been applied to the image of a wheel.

The second filtering stage included in the process of the invention comprises applying a plurality of filters for enhancing transformed image 111 parameters selected from at least one of quality, contrast, framing, focusing and combinations thereof. The search of the radii is performed disregarding non-selected sectors.

Additionally, the process may include a first calibrating stage for calibrating a center of a standard wheel model comprising:

locating a standard wheel model;

framing the image to center the standard wheel model;

altering lighting of the first lighting means 4 and focus of the first image capturing means 3 to obtain a clear and sharp image.

The process may even include a second calibrating stage for calibrating dimensions of a standard wheel model comprising:

pointing to minimum radius and maximum radius of the standard wheel model;

zooming to an image defined by said minimum radius point and maximum radius point;

introducing a standard wheel model diameter.

The invention claimed is:

1. A system for recognizing wheels by artificial vision comprising:

wheel locating means;

first image capturing means;

first lighting means;

first control means comprising:

first communicating means for communications between the first control means and the first image capturing means;

second communicating means for communications between the first control means and the first lighting means;

wherein:

the first image capturing means and the first lighting means are arranged above the wheel locating means so as to enable the first image capturing means to capture a front image of a wheel to obtain a captured front image;

the first communicating means sends said front image to the first control means;

the first control means processes said front image to obtain data for identifying a wheel model, said first control means further comprising first transforming means for converting a circular portion of the front image into a rectangular portion to obtain a transformed front image.

2. A system according to claim 1 wherein the first control means further comprises:

first filtering means for filtering a captured front image to obtain a first filtered front image;

said first transforming means converting a circular portion of the first filtered front image into a rectangular portion to obtain a transformed front image;

second filtering means for filtering a transformed front image to obtain a second filtered image;

recognizing means for receiving an identification of a recognized wheel.

3. A system according to claim 1 further comprising:

second image capturing means;

second lighting means;

third communicating means for communications between the first control means and the second image capturing means;

fourth communicating means for communications between the first control means and the second lighting means;

wherein:

the second image capturing means and the second lighting means are arranged on a side of the wheel locating means so as to enable the second image capturing means to capture a side image of a wheel to obtain a side captured image;

the third communicating means sends said side image to the first control means;

the first control means processes said side image to obtain data for identifying a wheel model.

4. A system according to claim 1 further comprising:

third image capturing means;

fifth communicating means for communications between the first control means and the third image capturing means;

second transforming means for converting a circular portion of the central image into a rectangular portion to obtain a transformed central image;

wherein:

the third image capturing means are arranged above the wheel locating means so as to enable the third image capturing means to capture a central image of a wheel to obtain a central captured image;

the fifth communicating means sends said side image to the first control means;
the first control means processes said side image to obtain data for identifying a wheel model.

5. A system according to claim 1 further comprising:
second image capturing means;
second lighting means;
third communicating means for communications between the first control means and the second image capturing means;
fourth communicating means for communications between the first control means and the second lighting means;
third image capturing means;
fifth communicating means for communications between the first control means and the third image capturing means;
second transforming means for converting a circular portion of the central image into a rectangular portion to obtain a transformed central image;
wherein:
the second image capturing means and the second lighting means are arranged on a side of the wheel locating means so as to enable the second image capturing means to capture a side image of a wheel to obtain a side captured image;
the third communicating means sends said side image to the first control means;
the first control means processes said side image to obtain data for identifying a wheel model;
the third image capturing means are arranged above the wheel locating means so as to enable the third image capturing means to capture a central image of a wheel to obtain a central captured image;
the fifth communicating means sends said side image to the first control means;
the first control means processes said side image to obtain data for identifying a wheel model.

6. A system according to claim 1 further comprising second control means external to the first control means, wherein the first control means further comprises sixth communicating means for communications between the first control means and the second control means.

7. A system according to claim 6 wherein the second control means further comprises at least one controller selected from:
a production machine controller;
an assembly machine controller;
a production line controller;
an assembly line controller;
and combinations thereof.

8. A system according to claim 7 wherein the first control means further comprises calibrating means to set standard wheel models which the wheel to be recognized are compared to.

9. A system according to claim 7 wherein the first control means further comprises storing means for storing standard wheel models which the wheel to be recognized are compared to.

10. A system according to claim 7 wherein the first control means further comprises
calibrating means to set standard wheel models;
storing means for storing standard wheel models;
which the wheel to be recognized are compared to.

11. A system according to claim 1 further comprising:
second image capturing means;
second lighting means;
third communicating means for communications between the first control means and the second image capturing means;
fourth communicating means for communications between the first control means and the second lighting means;
second control means external to the first control means;
wherein:
the second image capturing means and the second lighting means are arranged on a side of the wheel locating means so as to enable the second image capturing means to capture a side image of a wheel to obtain a side captured image;
the third communicating means sends said side image to the first control means;
the first control means processes said side image to obtain data for identifying a wheel model;
the first control means further comprises sixth communicating means for communications between the first control means and the second control means.

12. A system according to claim 11 wherein the second control means further comprises at least one controller selected from:
a production machine controller;
an assembly machine controller;
a production line controller;
an assembly line controller;
and combinations thereof.

13. A system according to claim 1 further comprising:
second image capturing means;
second lighting means;
third communicating means for communications between the first control means and the second image capturing means;
fourth communicating means for communications between the first control means and the second lighting means;
third image capturing means;
fifth communicating means for communications between the first control means and the third image capturing means;
second transforming means for converting a circular portion of the central image into a rectangular portion to obtain a transformed central image;
second control means external to the first control means;
wherein:
the second image capturing means and the second lighting means are arranged on a side of the wheel locating means so as to enable the second image capturing means to capture a side image of a wheel to obtain a side captured image;
the third communicating means sends said side image to the first control means;
the first control means processes said side image to obtain data for identifying a wheel model;
the third image capturing means are arranged above the wheel locating means so as to enable the third image capturing means to capture a central image of a wheel to obtain a central captured image;
the fifth communicating means sends said side image to the first control means;
the first control means processes said side image to obtain data for identifying a wheel model;
the first control means further comprises sixth communicating means for communications between the first control means and the second control means.

14. A system according to claim 13 wherein the second control means further comprises at least one controller selected from:
   a production machine controller;
   an assembly machine controller;
   a production line controller;
   an assembly line controller;
and combinations thereof.

15. A system according to claim 1 further comprising:
   second image capturing means;
   second lighting means;
   third communicating means for communications between the first control means and the second image capturing means;
   fourth communicating means for communications between the first control means and the second lighting means;
   third image capturing means;
   fifth communicating means for communications between the first control means and the third image capturing means;
   second transforming means for converting a circular portion of the central image into a rectangular portion to obtain a transformed central image;
   second control means external to the first control means;
wherein:
   the second image capturing means and the second lighting means are arranged on a side of the wheel locating means so as to enable the second image capturing means to capture a side image of a wheel to obtain a side captured image;
   the third communicating means sends said side image to the first control means;
   the first control means processes said side image to obtain data for identifying a wheel model;
   the third image capturing means are arranged above the wheel locating means so as to enable the third image capturing means to capture a central image of a wheel to obtain a central captured image;
   the fifth communicating means sends said side image to the first control means;
   the first control means processes said side image to obtain data for identifying a wheel model the first control means further comprises sixth communicating means for communications between the first control means and the second control means.

16. A system according to claim 15 wherein the second control means further comprises at least one controller selected from:
   a production machine controller;
   an assembly machine controller;
   a production line controller;
   an assembly line controller;
and combinations thereof.

17. A process for recognizing wheels by artificial vision wherein a system as defined in claim 1 is used, the process comprising a step for converting a circular portion of an image into a rectangular image by a polar transformation.

18. A process according to claim 17 comprising the following steps:
   capturing a front image of a wheel situated on locating means lit by first lighting means, by first image capturing means, to obtain a captured front image;
   applying a first filtering stage on the captured front image, by first filtering means, to obtain a first filtered front image;
   converting a circular portion of the first filtered front image into a rectangular front image through a polar transformation by first transforming means to obtain a transformed front image;
   measuring the wheel and determining material to obtain wheel dimensions and wheel material;
   applying a second filtering stage on the transformed front image, by second filtering means, to obtain a second filtered image;
   analyzing the second filtered image by comparing with pre-set standard wheel models stored in storing means for matching a wheel model to obtain a recognized wheel;
   sending an identification of the recognized wheel to recognizing means;
   returning to initial stage for receiving a next wheel to be recognized.

19. A process according to claim 18 wherein the recognized wheel takes a value selected between:
   valid wheel when the second filtered image and the pre-set standard wheel model are matched;
   defective wheel when the second filtered image and the pre-set standard wheel model are not matched.

20. A process according to claim 19 for enabling a user to set which portions of a captured image are visible wherein the first filtering stage comprises:
   dividing the captured image into 360°/α sectors, α being the degrees per sector;
   selecting the sectors showing a complete surface of the captured image to obtain a plurality of selected sectors;
   preparing the selected sectors to adequate black and white/color tone levels.

21. A process according to claim 20 wherein α is 45°.

22. A process according to claim 17 comprising the following steps:
   capturing a front image of a wheel situated on locating means lit by first lighting means, by first image capturing means, to obtain a captured front image;
   applying a first filtering stage on the captured front image, by first filtering means, to obtain a first filtered front image;
   capturing a side image of a wheel situated on locating means lit by second lighting means, by second image capturing means, to obtain a captured side image;
   converting a circular portion of the first filtered front image into a rectangular front image through a polar transformation by first transforming means to obtain a transformed front image;
   measuring the wheel and determining material to obtain wheel dimensions and wheel material;
   applying a second filtering stage on the transformed front image, by second filtering means, to obtain a second filtered image;
   analyzing the second filtered image by comparing with pre-set standard wheel models stored in storing means for matching a wheel model to obtain a recognized wheel;
   sending an identification of the recognized wheel to recognizing means;
   returning to initial stage for receiving a next wheel to be recognized.

23. A process according to claim 17 comprising the following steps:
   capturing a front image of a wheel situated on locating means lit by first lighting means, by first image capturing means, to obtain a captured front image;

applying a first filtering stage on the captured front image, by first filtering means, to obtain a first filtered front image;
capturing a central image of a wheel situated on locating means lit by first lighting means, by third image capturing means, to obtain a captured central image;
converting a circular portion of the first filtered front image into a rectangular front image through a polar transformation by first transforming means to obtain a transformed front image;
converting a circular portion of the central image into a rectangular central image through a polar transformation by the second transforming means to obtain a transformed central image;
measuring the wheel and determining material to obtain wheel dimensions and wheel material;
applying a second filtering stage on the transformed front image and on the transformed central image, by second filtering means, to obtain a second filtered image;
analyzing the second filtered image by comparing with pre-set standard wheel models stored in storing means for matching a wheel model to obtain a recognized wheel;
sending an identification of the recognized wheel to recognizing means;
returning to initial stage for receiving a next wheel to be recognized.

24. A process according to claim 17 comprising the following steps:
capturing a front image of a wheel situated on locating means lit by first lighting means, by first image capturing means, to obtain a captured front image;
applying a first filtering stage on the captured front image, by first filtering means, to obtain a first filtered front image;
capturing a side image of a wheel situated on locating means lit by second lighting means, by second image capturing means, to obtain a captured side image;
capturing a central image of a wheel situated on locating means lit by first lighting means, by third image capturing means, to obtain a captured central image;
converting a circular portion of the first filtered front image into a rectangular front image through a polar transformation by first transforming means to obtain a transformed front image;
converting a circular portion of the central image into a rectangular central image through a polar transformation by the second transforming means to obtain a transformed central image;
measuring the wheel and determining material to obtain wheel dimensions and wheel material;
applying a second filtering stage on the transformed front image and on the transformed central image, by second filtering means, to obtain a second filtered image;
analyzing the second filtered front image by comparing with pre-set standard wheel models stored in storing means for matching a wheel model to obtain a recognized wheel;
sending an identification of the recognized wheel to recognizing means;
returning to initial stage for receiving a next wheel to be recognized.

25. A process according to claim 17 further comprising a second calibrating stage for calibrating dimensions of a standard wheel model comprising:
pointing to minimum radius and maximum radius of the standard wheel model;
zooming to an image defined by said minimum radius point and maximum radius point;
introducing a standard wheel model diameter.

26. A process according to claim 18 for enabling a user to set which portions of a captured image are visible wherein the first filtering stage comprises:
dividing the captured image into $360°/\alpha$ sectors, $\alpha$ being the degrees per sector;
selecting the sectors showing a complete surface of the captured image to obtain a plurality of selected sectors;
preparing the selected sectors to adequate black and white/color tone levels.

27. A process according to claim 26 wherein $\alpha$ is 45°.

28. A process according to claim 26 wherein the second filtering stage comprises applying a plurality of filters for enhancing transformed image parameters selected from at least one of quality, contrast, framing, focusing and combinations thereof.

29. A process according to claim 26 further comprising a first calibrating stage for calibrating a center of a standard wheel model comprising:
locating a standard wheel model;
framing the image to center the standard wheel model;
altering lighting of the first lighting means and focus of the first image capturing means to obtain a clear and sharp front image.

30. A process according to claim 26 further comprising a second calibrating stage for calibrating dimensions of a standard wheel model comprising:
pointing to minimum radius and maximum radius of the standard wheel model;
zooming to an image defined by said minimum radius point and maximum radius point;
introducing a standard wheel model diameter.

31. A process according to claim 18 wherein the second filtering stage comprises applying a plurality of filters for enhancing transformed image parameters selected from at least one of quality, contrast, framing, focusing and combinations thereof.

32. A process according to claim 31 further comprising a first calibrating stage for calibrating a center of a standard wheel model comprising:
locating a standard wheel model;
framing the image to center the standard wheel model;
altering lighting of the first lighting means and focus of the first image capturing means to obtain a clear and sharp front image.

33. A process according to claim 31 further comprising a second calibrating stage for calibrating dimensions of a standard wheel model comprising:
pointing to minimum radius and maximum radius of the standard wheel model;
zooming to an image defined by said minimum radius point and maximum radius point;
introducing a standard wheel model diameter.

34. A process according to claim 18 further comprising a first calibrating stage for calibrating a center of a standard wheel model comprising:
locating a standard wheel model;
framing the image to center the standard wheel model;
altering lighting of the first lighting means and focus of the first image capturing means to obtain a clear and sharp front image.

35. A process according to claim 34 further comprising a second calibrating stage for calibrating dimensions of a standard wheel model comprising:

pointing to minimum radius and maximum radius of the standard wheel model;

zooming to an image defined by said minimum radius point and maximum radius point; introducing a standard wheel model diameter.

36. A process according to claim 34 further comprising a second calibrating stage for calibrating dimensions of a standard wheel model comprising:

pointing to minimum radius and maximum radius of the standard wheel model;

zooming to an image defined by said minimum radius point and maximum radius point;

introducing a standard wheel model diameter.

37. A process according to claim 19 wherein the second filtering stage comprises applying a plurality of filters for enhancing transformed image parameters selected from at least one of quality, contrast, framing, focusing and combinations thereof.

38. A process according to claim 19 further comprising a first calibrating stage for calibrating a center of a standard wheel model comprising:

locating a standard wheel model;

framing the image to center the standard wheel model;

altering lighting of the first lighting means and focus of the first image capturing means to obtain a clear and sharp front image.

39. A process according to claim 19 further comprising a second calibrating stage for calibrating dimensions of a standard wheel model comprising:

pointing to minimum radius and maximum radius of the standard wheel model;

zooming to an image defined by said minimum radius point and maximum radius point;

introducing a standard wheel model diameter.

40. A process according to claim 20 wherein the second filtering stage comprises applying a plurality of filters for enhancing transformed image parameters selected from at least one of quality, contrast, framing, focusing and combinations thereof.

41. A process according to claim 40 further comprising a first calibrating stage for calibrating a center of a standard wheel model comprising:

locating a standard wheel model;

framing the image to center the standard wheel model;

altering lighting of the first lighting means and focus of the first image capturing means to obtain a clear and sharp front image.

42. A process according to claim 40 further comprising a second calibrating stage for calibrating dimensions of a standard wheel model comprising:

pointing to minimum radius and maximum radius of the standard wheel model;

zooming to an image defined by said minimum radius point and maximum radius point; introducing a standard wheel model diameter.

43. A process according to claim 20 further comprising a first calibrating stage for calibrating a center of a standard wheel model comprising:

locating a standard wheel model;

framing the image to center the standard wheel model;

altering lighting of the first lighting means and focus of the first image capturing means to obtain a clear and sharp front image.

44. A process according to claim 20 further comprising a second calibrating stage for calibrating dimensions of a standard wheel model comprising:

pointing to minimum radius and maximum radius of the standard wheel model;

zooming to an image defined by said minimum radius point and maximum radius point; introducing a standard wheel model diameter.

* * * * *